April 15, 1969 V. S. KUZNETSOV ET AL 3,438,191

SOCKETS FOR SPINDLES

Filed June 5, 1967 Sheet 1 of 2

United States Patent Office 3,438,191
Patented Apr. 15, 1969

1

3,438,191

SOCKETS FOR SPINDLES

Viktor Sergeevich Kuznetsov, Kolomna, ul. Gagarina 66, kv. 8; Evgeny Ivanovich Belyaev, Kolomna, ul. Moskvoretskaya 15; Tatiana Petrovna Tereschenko, Kolomna, Oksky prospekt 3, kv. 53; Nikolai Alexandrovich Pechnikov, Kolomna, ul. Krasnogvardeiskay 2–a, kv. 10; Vyacheslav Fedorovich Taschilin, Kolomna, ul. Pionerskaya 5, kv. 31, all of Moskovskaya obl., U.S.S.R.; and Yakov Ilich Korityssky, ul. Nagornaya 34, korp. 45, kv. 35; and Igor Vladimirovich Kornev, ul. Pogodina 14/16, kv. 28, both of Moscow, U.S.S.R.

Filed June 5, 1967, Ser. No. 643,532
Int. Cl. D01h *7/12*
U.S. Cl. 57—135 5 Claims

ABSTRACT OF THE DISCLOSURE

A socket for a spindle used in the textile industry comprising a tubular bushing body on which is coaxially mounted an assembly of a pair of detachably connected split bushings such that the assembly is removable from the bushing body by disconnection of the split bushings. A first spindle bearing is supported in the bushing body and a second spindle bearing is supported in the assembly of the split bushings.

The present invention relates to spindles used in the textile industry on spinning machines or combined machines for spinning and twisting, and more particularly to sockets of these spindles.

Known at present in the textile industry are sockets for spindles which are essentially bushings consisting of two separate longitudinal component parts, each of which has inner fitting places where the fits are made for bearings of the spindle shaft.

The main disadvantage of the known sockets is that they have to be removed from the machine in case it is required to renew grease or bearings, on account of which the centering of the spindles is broken and the time for servicing is increased.

An object of the present invention is to provide a seating for spindles used in the textile industry which is convenient in servicing.

The principal object of the invention is to provide a socket for spindles used in the textile industry which preserves the centering of the spindle when the grease or bearings are being replaced.

These and other objects are achieved by an arrangement in which the spindle socket comprises upper and lower component parts joined together in such a manner that it is possible to separate them, centered one with respect to another, and each provide with a fitting region where upper or lower bearings, respectively are supported.

It is expedient that said lower component part be made as a split bushing, with each component part having an inner collar preventing the axial displacement of the bearing during the spindle operation.

Given hereinbelow is the description of an exemplary embodiment of the invention, taken in conjunction with the appended drawings, in which.

2

Figures 1, 2, 3, 5:
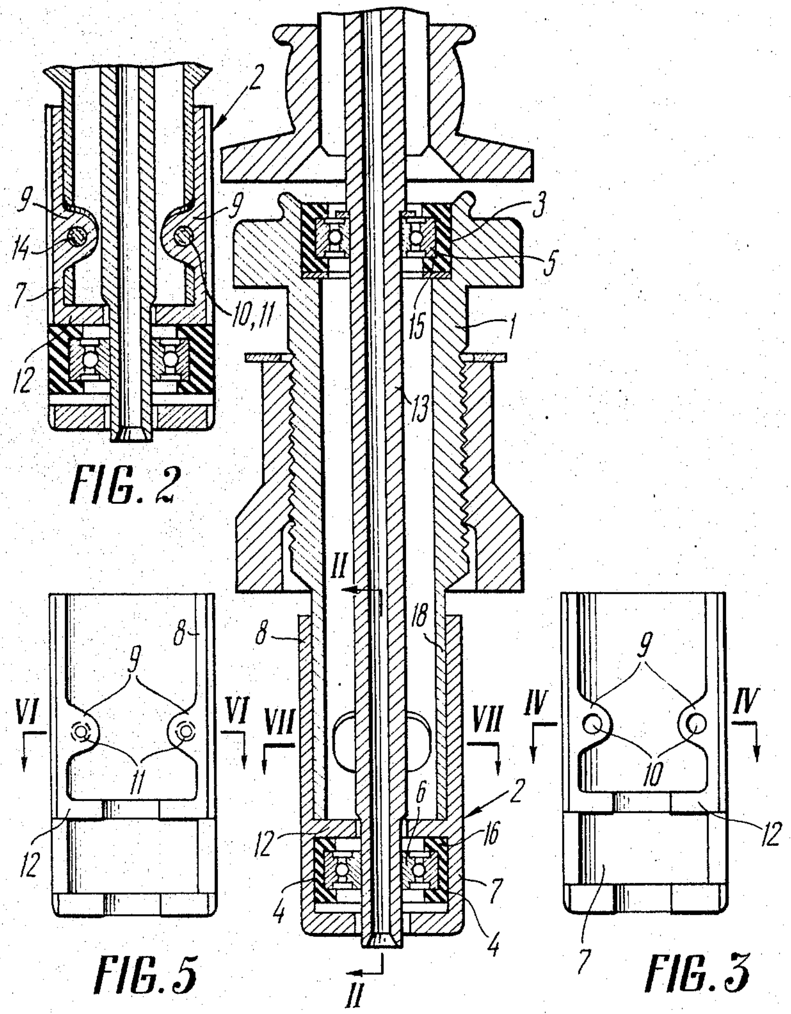
FIG. 1 is a longitudinal sectional view of the socket according to the invention.
FIG. 2 is a sectional view, taken on line II—II of FIG. 1.
FIG. 3 is a front view of a component part of the socket split bushing, according to the invention.
Figures 4, 6, 7, 8:
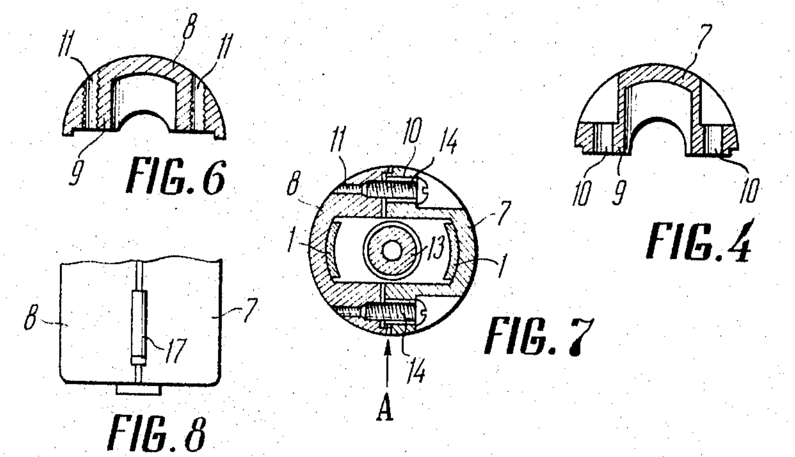
FIG. 4 is a sectional view, taken on the line IV—IV in FIG. 3.
Figure 9:
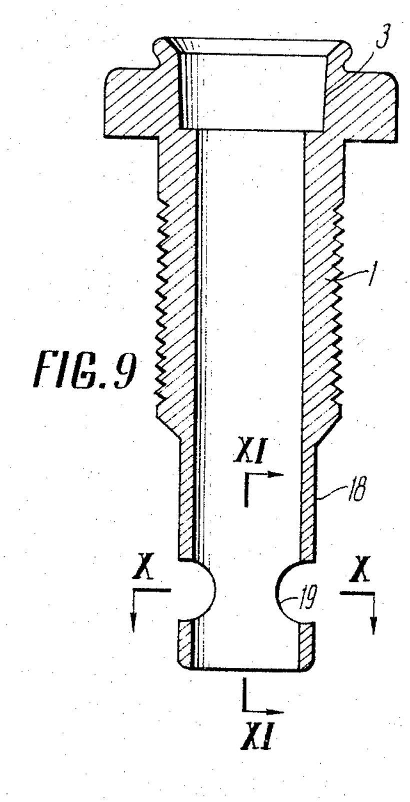
Figure 10:
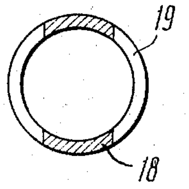

FIG. 5 is a front view of another component part of the socket split bushing;

FIG. 6 is a sectional view, taken on the line VI—VI in FIG. 5;

FIG. 7 is a sectional view, taken on the line VII—VII in FIG. 1;

FIG. 8 is a view in the direction of arrow A in FIG. 7;

FIG. 9 is a longitudinal sectiional view of the upper component part of the socket, according to the invention;

FIG. 10 is a sectional view, taken on the line X—X in FIG. 9; and

Figure 11:
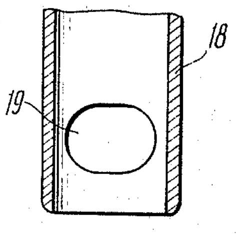

FIG. 11 is a sectional view, taken on the line XI—XI in FIG. 9.

The spindle socket consists of a hollow bushing 1 (FIG. 1) and a lower split bushing 2, each having regions 3 and 4 for bearings 5 and 6.

The split bushing 2 consists of two casings 7 and 8, each of which has bosses 9 (FIG. 2) with holes 10 and 11 for accommodating screws. The holes 10 (FIGS. 3 and 4) in the casing 7 of the bushing 2 are made smooth, while the holes 11 (FIGS. 5 and 6) in the casing 8 of the bushing 2 are provided with threads. The casings 7 and 8 (FIG. 1) have a transverse collar 12 to prevent the axial displacement of the spindle shaft 13, and are attached to each other and to the bushing 1 at the same time by the aid of screws 14 (FIG. 7). The casings 7 and 8 are shaped as shown in FIGS. 3, 4, 5 and 6.

The bearings 5 and 6 (FIG. 1) are mounted in shock absorbers 15 and 16. The absorber 16 has two projections entering the grooves 17 (FIG. 8) formed by the casings 7 and 8.

The bushing 1 (FIG. 1) is attached to the machine spindle bar (not shown in the drawing) and is of stepped design. Its cylindrical portion 18, having a reduced diameter, enters the interior of the split bushing 2, owing to which the latter is centered relative to the bushing 1. The cylindrical portion 18 of the bushing 2 is provided with grooves 19 (FIG. 9) accommodating the bosses 9 (FIG. 2) of the casings 7 and 8.

The grooves 19 are shaped as shown in FIGS. 10 and 11. The inner diameter of the bushing 1 is larger than the outer diameter of the lower bearing 6, which prevents removal of the bushing 1 from the machine spindle bar when replacing bearings or grease, and prevents interference with the socket centering.

When it is necessary to remove the shaft 13 together with the bearings 5 and 6 from the machine, the screws 14 are unscrewed, the casings 7 and 8 are removed from the cylindrical portion 18 of the bushing 1, and the shaft 13 is removed in the upward direction from said bushing.

What is claimed is:

1. A socket for a spindle comprising first and second tubular bushing bodies detachably coupled together in coaxial relation, and first and second bearings for supporting a spindle, one bearing being mounted in the first bushing body and the other bearing being mounted in the second bushing body in axially spaced relation from said one bearing.

2. A socket as claimed in claim 1 wherein said second tubular bushing body comprises a pair of detachably connected split bushings which are mounted on the first bushing body so as to be removable by disconnection of the split bushings.

3. A socket as claimed in claim 2 wherein said first tubular body has an annular groove in which said one bearing is received, said pair of split bushings cooperatively defining an annular space in which the other bearing is received.

4. A socket as claimed in claim 3 wherein each split bushing has a collar to retain said other bearing axially in said space.

5. A socket as claimed in claim 4 wherein said split bushings include respective internal lugs which face one another for assembly of the second bushing and fastener means for detachably connecting the split bushings at said lugs, said first bushing body being inserted within the split bushings and having grooves for receiving said lugs.

References Cited

UNITED STATES PATENTS

| | | | |
|---|---|---|---|
| 2,017,957 | 10/1935 | Erhard | 57—134 XR |
| 2,781,628 | 2/1957 | Andrews et al. | 57—135 |
| 2,781,629 | 2/1957 | Winslow | 57—135 |
| 3,019,591 | 2/1962 | Cortabarria | 57—135 |
| 3,153,314 | 10/1964 | Hammond | 57—135 |

FOREIGN PATENTS

| | | |
|---|---|---|
| 117,880 | 6/1958 | U.S.S.R. |

STANLEY N. GILREATH, *Primary Examiner.*

W. H. SCHROEDER, *Assistant Examiner.*

U.S. Cl. X.R.

308—152